July 9, 1957 K. E. H. BACKMAN ET AL 2,799,001
CONVERTING SYSTEM
Filed Sept. 16, 1953
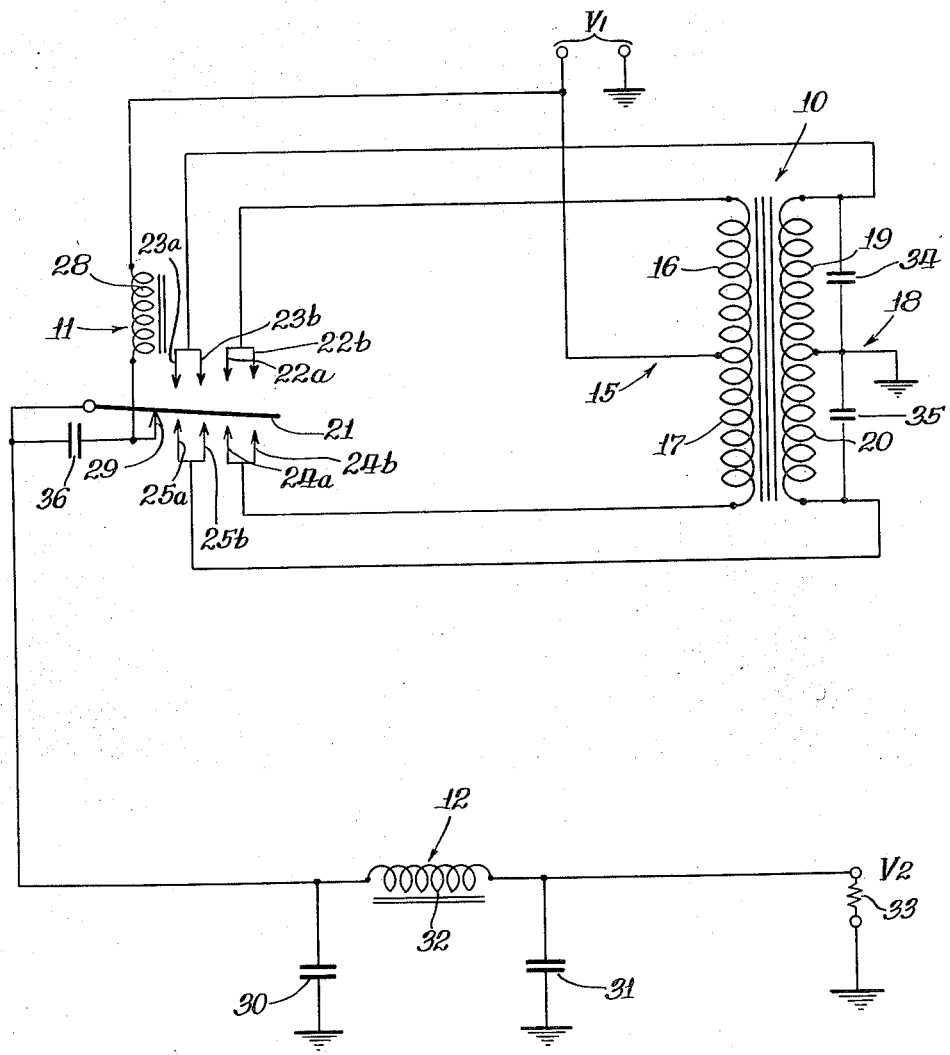
INVENTORS.
Kenneth E. H. Backman
Allen R. Madland
By Foorman L. Mueller
Atty.

United States Patent Office 2,799,001
Patented July 9, 1957

2,799,001
CONVERTING SYSTEM

Kenneth E. H. Backman, Chicago, and Glen R. Madland, Elmhurst, Ill., assignors to Motorola, Inc., Chicago, Ill., a corporation of Illinois Application September 16, 1953, Serial No. 380,516

7 Claims. (Cl. 321—48)

This invention relates generally to direct current voltage converting systems, and more particularly to a highly efficient vibrator circuit for converting a higher direct current voltage to a lower direct current voltage.

Various devices have been developed for conversion of direct current voltages and these have generally been of two types; the vibrator type, and the rotary converter or dynamotor type. The rotary converter type has had the disadvantage that such units have been quite expensive. The vibrator type units have had the disadvantage that they have tended to be noisy and to have relatively short life. These latter defects have been overcome largely by improved vibrator structures, but the resulting units still have the disadvantage of loss of power resulting from inefficiency of the units.

Such units have been developed mainly for converting from lower voltages to higher voltages, but there are important applications wherein it is desired to convert from higher voltages to lower voltages. Such an application is for use in automobiles for converting from twelve volts to six volts. In the past the electrical system of automobiles has been a six volt system and equipment such as radio equipment and the like has operated from six volt power supplies. However, twelve volt systems are being used in some instances and in order to use existing equipment a converter is needed.

It is therefore an object of the present invention to provide a more efficient vibrator type direct current voltage converting system.

A further object of this invention is to provide a voltage converting system which is highly efficient in stepping down direct current voltages from a first value to a second lower value.

A feature of the present invention is the provision of a vibrator type direct current voltage converting system wherein a vibrator connects transformer windings in such a way that auto transformers are provided which operate efficiently to convert a direct current from a first value to a second value.

A further feature of this invention is the provision of a step-down direct current voltage converting system including a transformer with two magnetically coupled divided winding sections and a vibrator structure which alternately connects one set of winding sections, and then the other set, as auto transformers for converting the interrupted voltage to provide efficient voltage transformation.

Another feature of this invention is the provision of such a step-down voltage converting system wherein the transformer windings are substantially identical and the two sections are substantially equal to provide a two to one step down. This makes the voltages across the sections equal and the currents therein also equal to minimize sparking at the vibrator contacts. The sections of the two windings are alternately rendered operative to provide, in effect, full wave operation resulting in very high efficiency.

Further objects, features and the attending advantages of the invention will be apparent from a consideration of the following description when taken in connection with the single figure of the drawing.

In practicing the invention there is provided a vibrator type voltage converting system including a transformer having first and second magnetically coupled windings each being divided into two identical sections which are defined by intermediate terminals and end terminals. A vibrator structure is provided including a movable conducting member which moves from one position engaging two operating contacts to the other position engaging two other operating contacts. Driving means is provided for the contactor including a driving coil and a driving contact. The operating contacts on one side are connected to one adjacent pair of winding end terminals, and the contacts on the other side are connected to the other end terminals. The voltage source is connected to the intermediate terminal of one winding and the intermediate terminal of the other is connected to ground. Accordingly, when the contacts on one side are made, a circuit is completed from the source to ground through one section of each winding in series. The contactor is connected to the common connection of the two sections and the stepped down voltage output is derived from this point. The output is filtered to remove the ripple produced by the vibrator action. Sections of the two windings are therefore interconnected to form a first auto transformer and the other sections of the two windings form a second auto transformer. These transformers are alternately connected to step down the voltage, with the vibrator interrupting and rectifying the voltage while changing the connections from one auto transformer to the other.

Referring now to the drawing there is shown the system in accordance with the invention which is formed by the transformer 10, vibrator 11 and filter 12. The transformer 10 includes a first winding 15 including sections 16 and 17. A second winding 18 is magnetically coupled to the first winding 15 and includes sections 19 and 20. Winding 15 includes an intermediate terminal for connection to the voltage source V1, and winding 18 has an intermediate terminal for connection to a reference potential such as ground. The source V1 may be the usual automobile battery with one terminal thereof connected to the frame which serves as a ground for the system. The vibrator structure includes a vibrating conductor 21, a first group of operating contacts 22a, 22b, 23a and 23b on one side thereof, and a second group of operating contacts 24a, 24b, 25a and 25b on the other side thereof. The a and b contacts of each pair are interconnected, and operate to divide the current therebetween to reduce arcing of the contacts. The vibrator structure itself is known in the art and further description is not believed to be necessary. Driving means is provided for the vibrator structure including magnetic driving coil 28 and auxiliary driving contact 29.

The filter 12 is connected to the vibrating contact 21 and provides the output of the voltage connecter system. The filter 12 includes condensers 30 and 31 and coil 32 which form a low pass filter for removing fluctuations of the voltage so that a substantially steady direct current voltage is provided at the output terminal V2. Condensers 34 and 35 serve as buffers across the transformer windings. Condenser 36 acts to suppress arcs at the contact 29.

Considering now the operation of the system, the vibrating structure 11 is constructed so that when it is at rest the vibrating contact 21 engages the contact 29. Accordingly when voltage is applied to the system at V1 a circuit is completed through the driving coil 28, contact 29, the filter choke 32 and the load 33 at output terminals V2. Coil 28 will then produce a field causing the contact 21 to move upwardly to engage the contacts 22 and 23. This, of course, disengages the connection through contact 29 so that the coil is de-energized and the vibrating structure swings downwardly to a position engaging contacts 24 and 25. This again closes the circuit through contact 29 to energize the coil 28 so that the operation is repeated. The speed of vibration will depend upon the natural frequency of vibration of member 21 and upon the construction of the unit as a whole. After the reed member 21 reaches its natural amplitude and frequency, the electrical potential of this same member 21 will be 6 volts, thus the coil 28 will be operating between a difference of potential of 6 volts and 12 volts, or 6 volts. Hence, it becomes apparent that the load 33, or some other closed circuit, must be across the terminals V2 in order for vibrator action to commence.

When the vibrating contact 21 moves up to a position engaging contacts 22 and 23, the voltage V1 will be applied across the winding sections 16 and 19 in series, and the vibrating contact 21 will provide a connection to the intermediate point between these windings. Accordingly, the windings 16 and 19 will form an auto transformer which will transform the voltage from the source to a lower voltage appearing across winding 19. This voltage is rectified by the vibrator, and applied to the filter 12 which provides the output of the converter. During the other half of the vibrating cycle the windings 17 and 20 will be connected in series between the voltage source and ground through contacts 24 and 25, and the vibrating contact 21 will be connected to the intermediate point. Again, the sections 17 and 20 will form an auto transformer with the stepped down voltage appearing across winding section 20 being applied to the output filter.

It will be apparent that for proper operation of the system the winding sections 16 and 17 of transformer winding 15 must be equal, and the winding sections 19 and 20 of transformer winding 18 must be equal so that the step down ratio is the same during both halves of the cycle. When it is desired to step down by a two to one factor, the sections of the two windings must all be substantially equal. The system has been found to operate most satisfactorily under such conditions as the voltages across the two windings are equal and the currents through the two contacts are equal so that the arcing of the contacts is held to a minimum.

The converter has been found to be particularly useful for conversion from 12 volt to 6 volt operation. There is a great need for such a converter inasmuch as the voltage source in many automobiles is being changed from 6 to 12 volts and equipment available for use on the vehicle, such as radio equipment, is constructed for 6 volt operation. Since the power available is limited, it is desirable to convert from 12 to 6 volt operation at very high efficiency. Units in accordance with the invention have been found to have very high efficiencies, with efficiencies of over 80 percent having been obtained.

Although one embodiment of the invention has been described which is illustrative thereof, it is obvious that various changes and modifications can be made therein within the intended scope of the invention as defined in the appended claims.

We claim:

1. A step down direct current voltage converting system including in combination, a transformer including first and second substantially identical magnetically coupled windings, each of said windings having first and second substantially identical series sections with an intermediate terminal interconnecting said sections and end terminals at the outer ends of the sections, a vibrator structure including first and second pairs of contacts and vibrating conducting means adapted to move back and forth between a first position in engagement with said contacts of said first pair and a second position in engagement with said contacts of said second pair, means connecting said terminals at said ends of said first sections of said windings to said contacts of said first pair, means connecting said terminals at said ends of said second sections of said windings to said contacts of said second pair, means for connecting a source of potential between said intermediate terminal of said first winding and said intermediate terminal of said second winding, and output means connected to said vibrating conducting means, so that said first sections and said second sections are alternately connected in series between said source of potential and said reference potential and said output circuit is alternately connected between said first sections and said second sections, whereby said first sections and said second sections alternately serve as auto transformers for stepping down the voltage of the source.

2. A direct current voltage converting system including in combination, a transformer including first and second magnetically coupled windings, each of said windings having first and second substantially identical series sections with an intermediate terminal interconnecting said sections and end terminals at the outer ends of the sections, a vibrator structure including first and second pairs of contacts and vibrating conducting means adapted to move back and forth between a first position in engagement with said contacts of said first pair and a second position in engagement with said contacts of said second pair, means connecting said terminals at said ends of said first sections of said windings to said contacts of said first pair, means connecting said terminals at said ends of said second sections of said windings to said contacts of said second pair, so that said first sections and said second sections are alternately connected in series between said intermediate terminal of said first winding and said intermediate terminal of said second winding, and said vibrating conducting means is alternately connected between said first sections and said second sections.

3. A step down direct current voltage converting system including in combination, a transformer including first and second magnetically coupled windings, each of said windings having first and second substantially identical series connected sections with an intermediate terminal interconnecting said sections and end terminals at the outer ends of said sections, a vibrator structure including first and second pairs of contacts and vibrating conducting means adapted to move from a first position in engagement with said first pair of contacts to a second position in engagement with said second pair of contacts, means connecting said terminals at said ends of said first sections of said windings to said contacts of said first pair, means connecting said terminals at said ends of said second sections of said windings to said contacts of said second pair, means for connecting a source of potential between said intermediate terminal of said first winding and said intermediate terminal of said second winding, and output filter means connected to said vibrating conducting means, so that said first sections and said second sections are alternately connected in series across said source of potential and said output filter is alternately connected between said first sections and said second sections, whereby said first sections and said second sections alternately form auto transformers for stepping down the interrupted voltage of the source, and said vibrator structure connects the stepped down voltage of one polarity to said filter means.

4. A direct current voltage converting system including in combination, a transformer including first and second magnetically coupled windings, each of said windings having first and second substantially identical series connected sections with an intermediate terminal interconnecting said sections and end terminals at the outer ends of said sections, a vibrator structure including first and second pairs of contacts and vibrating conducting means adapted to move from a first position in engagement with said first pair of contacts to a second position in engagement with said second pair of contacts, means connecting said terminals at said ends of said first sections of said windings to said contacts of said first pair, means connecting said terminals at said ends of said second sections of said windings to said contacts of said second pair, means for connecting a source of potential between said intermediate terminal of said first winding and said intermediate terminal of said second winding, and output circuit means connected to said vibrating conducting means, so that said first sections and said second sections are alternately connected in series across said source of potential and said output circuit is alternately connected between said first sections and said second sections, whereby said first sections and said second sections alternately form auto transformers for transforming the interrupted voltage of the source.

5. A step down direct current voltage converting system including in combination, a transformer including first and second substantially identical magnetically coupled windings, each of said windings having first and second substantially identical series connected sections with an intermediate terminal inter-connecting said section and end terminals at the outer ends of said sections, a vibrator structure including driving means, a driving contact, first and second pairs of operating contacts and vibrating conducting means adapted to move between a first position in engagement with said driving contact and said operating contacts of said first pair and a second position in engagement with said operating contacts of said second pair, means connecting said terminals at said ends of said first sections of said windings to said operating contacts of said first pair, means connecting said terminals at said ends of said second sections of said windings to said operating contacts of said second pair, means for connecting a source of potential to said intermediate terminal of said first winding, means connecting said intermediate terminal of said second winding to a reference potential, output means connected to said vibrating conducting means, and a driving circuit connecting said driving means between said source of potential and said driving contact for energizing said driving means, said vibrating conducting means being biassed to an initial position in engagement with said driving contact and being moved to said second position in response to energization of said driving means and swinging to said first position in response to deenergization of said driving means, so that said first sections and said second sections are alternately connected in series between said source of potential and said reference potential and said output circuit is alternately connected between said first sections and said second sections, whereby said first sections and said second sections alternately form auto transformers for stepping down the voltage of the source.

6. A direct current voltage converting system including in combination, a transformer including first and second magnetically coupled windings, each of said windings having first and second series connected sections with an intermediate terminal interconnecting said section and end terminals at the outer ends of said sections, a vibrator structure including driving means, a driving contact, first and second pairs of operating contacts and vibrating conducting means adapted to move between a first position in engagement with said driving contact and said operating contacts of said first pair and a second position in engagement with said operating contacts of said second pair, means connecting said terminals at said ends of said second sections of said windings to said contacts of said second pair, and a driving circuit connecting said driving means between said source of potential and said driving contact for energizing said driving means, said vibrating conducting means being biassed to an initial position in engagement with said driving contact and being moved to said second position in response to energization of said driving means and swinging to said first position in response to deenergization of said driving means, so that said first sections and said second sections are alternately connected in series to form auto transformers alternately connected to said vibrating conducting means.

7. A direct current voltage converting system including in combination, a transformer including first and second magnetically coupled windings each having first and second terminals, a vibrator structure including a pair of contacts and vibrating conducting means adapted to intermittently engage said contacts to interconnect the same, means individually connecting said first terminals of said windings to said contacts of said vibrator structure, means for connecting said second terminal of one of said windings to a reference potential, means for connecting a source of potential between said second terminal of the other winding and said reference potential, and filter means connected to said vibrating conducting means and to said reference potential, so that said first and second windings are intermittently connected in series across the source of potential by said vibrating conducting means, and said vibrating conducting means connects said filter means to a point between said first and second windings to apply the stepped down voltage at said point to said filter means.

References Cited in the file of this patent
UNITED STATES PATENTS
2,703,376     Board _____ Mar. 1, 1955

OTHER REFERENCES

Mallory Vibrator Data Book, March 1947, P. R. Mallory & Co.